United States Patent [19]
Vannatta et al.

[11] Patent Number: 6,140,807
[45] Date of Patent: Oct. 31, 2000

[54] ELECTRONIC DEVICE AND ASSOCIATED METHOD FOR CHARGING AN ENERGY STORAGE CIRCUIT WITH A DC-DC CONVERTER

[75] Inventors: Louis Jay Vannatta; William P. Alberth, Jr., both of Crystal Lake; Terrie Frane, Bloomingdale, all of Ill.

[73] Assignee: Motorola, Inc., Schaumburg, Ill.

[21] Appl. No.: 09/164,559

[22] Filed: Oct. 1, 1998

[51] Int. Cl.$^7$ ....................................................... G05F 1/46
[52] U.S. Cl. ........................... 323/283; 323/222; 323/284
[58] Field of Search .................................... 323/282, 283, 323/284, 285, 288, 222

[56] References Cited

U.S. PATENT DOCUMENTS

| 410,596 | 8/1978 | Weaver et al. ............................. | 323/288 |
| 4,155,112 | 5/1979 | Miller et al. ............................... | 363/21 |
| 4,495,648 | 1/1985 | Giger ......................................... | 455/73 |
| 4,709,404 | 11/1987 | Tamura et al. ............................. | 455/126 |

*Primary Examiner*—Jessica Han
*Attorney, Agent, or Firm*—Brian M. Mancini; John J. Oskorep

[57] ABSTRACT

An electronic device includes an electrical circuitry interface (112) adapted for coupling with an energy source (106), a comparator (138), and a DC-DC converter circuitry (134) having a switch circuit (161) and an energy storage circuit (132). The switch circuit (161) is coupled to the electrical circuitry interface (112) and to the energy storage circuit (132), and is controlled to charge the energy storage circuit (132). A first input (166) of the comparator (138) is coupled to a voltage that varies with a nominal supply voltage of the energy source (106). A second input (168) of the comparator (138) is coupled to a threshold voltage. A comparator output (160) of the comparator (138) is coupled to the switch circuit (161). In operation, the DC-DC converter circuitry (134) charges the energy storage circuit (132) for a certain time period or until the stored voltage is greater then a desired voltage. The DC-DC converter circuitry (134) is controlled to stop charging the energy storage circuit (132) when current demands cause the energy source voltage to exceed a threshold voltage.

31 Claims, 7 Drawing Sheets

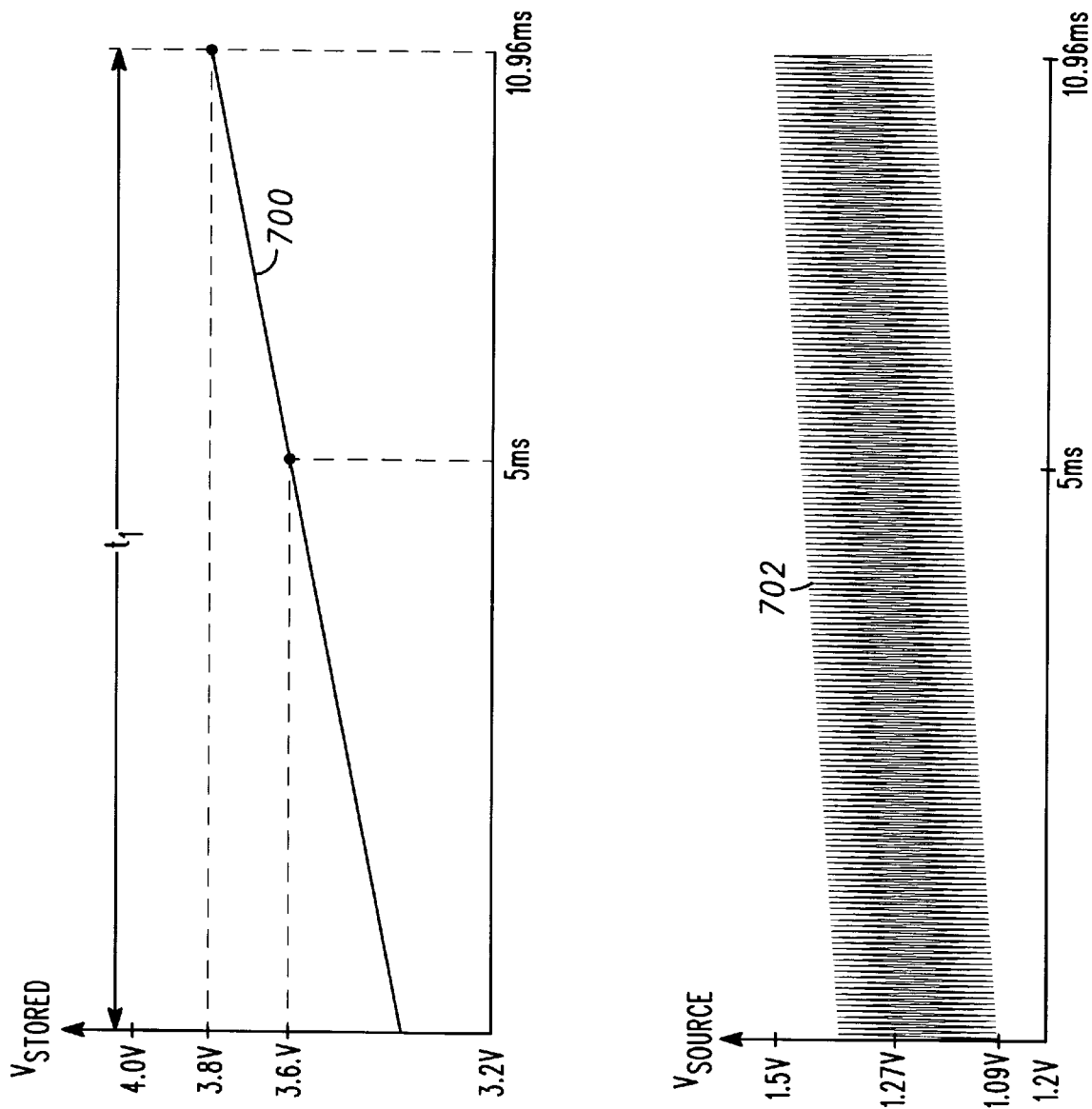

ELECTRONIC DEVICE AND ASSOCIATED METHOD FOR CHARGING AN ENERGY STORAGE CIRCUIT WITH A DC-DC CONVERTER

FIELD OF THE INVENTION

The present invention relates generally to electronic devices that may be powered by portable energy sources. More particularly, the present invention relates to electronic devices with DC-DC converters for charging energy storage circuits.

BACKGROUND OF THE INVENTION

Consumers want smaller electronic devices that provide more advanced features. Such devices include compact disc players, two-way radios, cellular telephones, and computer devices to name a few. To become smaller, these electronic devices need to use smaller portable energy sources.

Electronic circuits operating at lower voltages reduce the energy consumption of such devices. As a result, a lower operating voltage reduces the size of the portable energy source required to operate an electronic device over a desired period of time. However, some circuits, such as amplifier circuits, operate most efficiently at higher voltages.

Despite low voltage advancements, a portable energy source may be too bulky, too heavy, or may not last long enough for many high power applications. For example, a portable energy source, such as a battery or battery pack, must often deal with short term surges in currents drawn by an electronic device. The battery must be robust enough to provide peak current that may be substantially higher than the average current of the electronic device. Consequently, an electronic device often has a larger battery to meet its power requirements even though a smaller battery would be sufficient for its energy requirements.

To alleviate these problems, an electronic device may be powered by an energy system that includes a capacitor connected in parallel with a battery. Here, the capacitor effectively lowers the impedance of the energy system. During relatively large current pulses, a properly selected capacitor will reduce a voltage drop in the system because of its lower equivalent series resistance. However, the smaller voltage drop associated with these systems is too large for adequate operation in electronic circuits operating at even lower voltages. In such circuits, the voltage drop from the capacitor may cause parts of the electronic device to operate unreliably.

Consequently, there is a need for an electronic means to accommodate these limitations that is suitable for low voltage applications with large current pulse requirements.

SUMMARY OF THE INVENTION

As discussed in greater detail below, the present invention overcomes the limitations of the existing art. The primary object of the present invention is to provide an electronic device and method that is suitable for low voltage applications with large current pulse requirements. This object and other benefits are achieved by the present invention.

In the present invention, an electronic device has an electrical circuitry interface adapted for coupling with an energy source, a comparator, and DC-DC converter circuitry having a switch circuit and an energy storage circuit. The electronic device could be a mobile station, a portable radio telephone, or similar radio communication device. The switch circuit is coupled to the electrical circuitry interface and to the energy storage circuit. The switch circuit is controlled to charge the energy storage circuit during certain time intervals. The first input of the comparator is coupled to a voltage that varies with a nominal supply voltage of the energy source. A second input of the comparator circuit is coupled to a threshold voltage. The comparator output is coupled to the switch circuit.

In operation, the DC-DC converter circuitry is controlled to charge the energy storage circuit for a certain time period or until the stored voltage is greater then a desired voltage. The DC-DC converter circuitry also is controlled to stop charging of the energy charge device when current demands of the energy storage circuit cause the energy source voltage to equal or be less than a threshold voltage. If the energy source voltage is equal to or less than the threshold voltage, parts of the electrical circuitry may not operate reliably.

BRIEF DESCRIPTION OF THE DRAWINGS

The present invention is better understood when read in light of the accompanying drawings, in which:

FIG. 7A is a graph showing a stored voltage ($V_{STORED}$) of an energy storage circuit versus time, using a first test circuit not having a comparator circuit.

FIG. 7B is a graph showing a source voltage ($V_{SOURCE}$) of the first test circuit versus time.

DETAILED DESCRIPTION OF THE INVENTION

Figure 1:
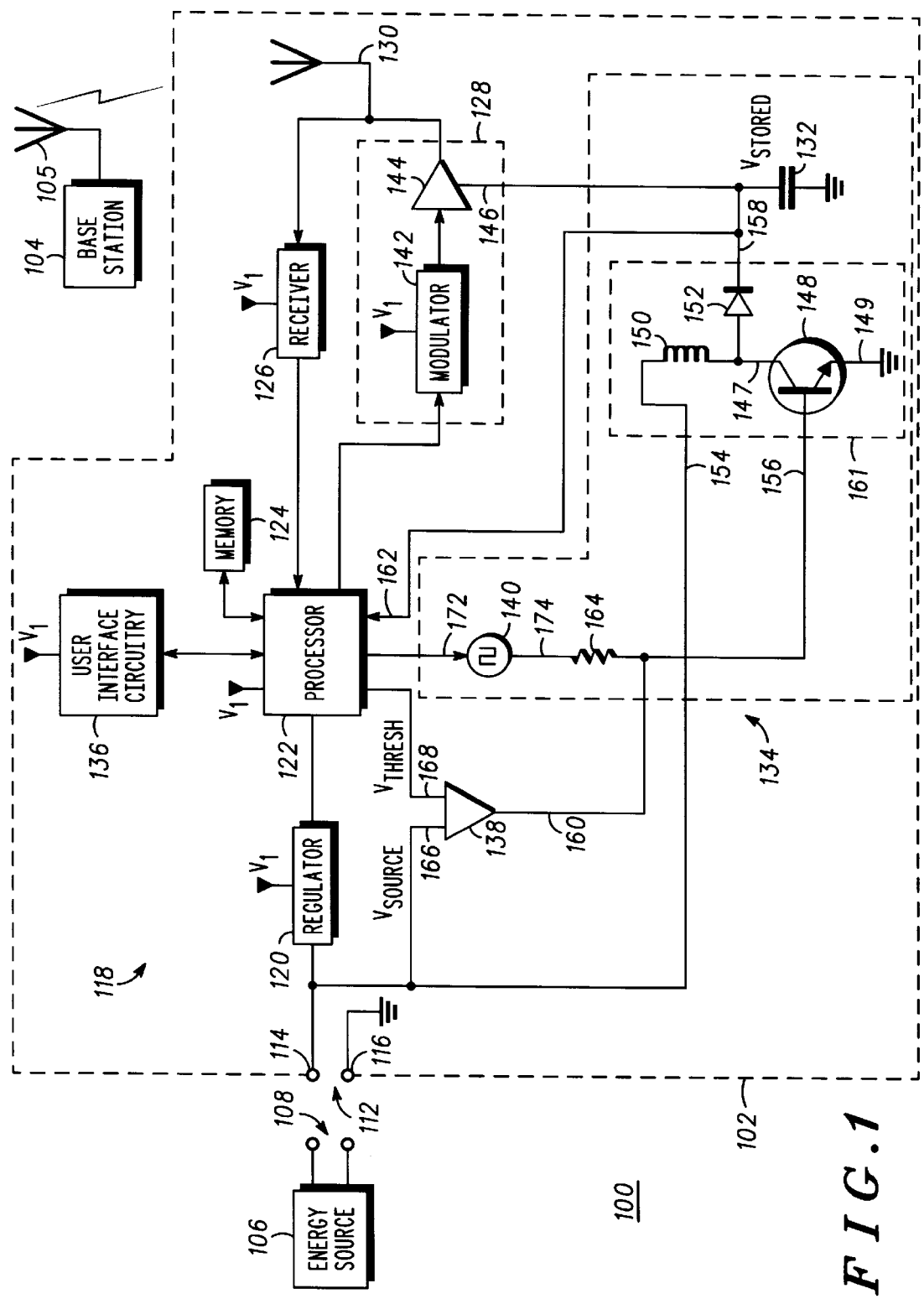
FIG. 1 is a block diagram of a communication system including a mobile station and a base station, and a schematic diagram of electrical circuitry of the mobile station.

FIG. 1 is a schematic block diagram of a communication system 100 that includes a mobile station 102 and a base station 104. Mobile station 102 can be an electronic device such as a portable radio telephone, a cellular telephone, or similar radio communication device. Mobile station 102 and base station 104 communicate via radio frequency (RF) signals over a radio communication channel.

Communication system 100 could be a cellular telephone system or any other system using radio signals. More specifically, communication system 100 could be a cellular telephone system operating in accordance with a time-division multiple access (TDMA) protocol, such as the Personal Digital Cellular (PDC) system used in Japan. A mobile station operating in accordance with a TDMA protocol is an application requiring pulsed currents from an energy source. A relatively large current is required during each transmit time slot of the TDMA protocol, whereas a relatively small current is required during each non-transmit time slot, such as in each receive time slot of the TDMA protocol.

Mobile station 102 includes electrical circuitry 118 disposed in a housing (not shown) and electrical circuitry interface 112 carried on the housing and coupled to electrical circuitry 118. Electrical circuitry interface 112 is configured for coupling to an energy source 106, where electrical contacts 114 and 116 of electrical circuitry interface 112 make contact with and electrically couple to energy source interface 108 of energy source 106. Energy source 106 may be a portable energy source.

Preferably, energy source 106 is a battery (or batteries) having a size and weight suitable for hand-held portability, and may be a battery pack. A battery pack typically includes at least one battery cell with a suitable packaging and mechanism for being carried on and connected to mobile station 102. The batteries may be off-the-shelf such as alkaline batteries. Energy source interface 108 may be any suitable battery or battery pack interface compatible with electrical circuitry interface 112.

Electrical circuitry interface 112 is coupled to regulator 120, switch circuit 161, and comparator 138. Electrical circuitry interface 112 is electrically and mechanically configured for coupling with energy source interface 108 of energy source 106

Electrical circuitry 118 includes regulator 120, processor 122, memory 124, receiver 126, transmitter 128, mobile antenna 130, user interface circuitry 136, DC-DC converter circuitry 134, and comparator 138. DC-DC converter circuitry 134 consists of an oscillator 140, resistor 164, switch circuit 161, and energy storage circuit 132. Oscillator 140 is controlled by processor 122.

Receiver 126 and transmitter 128, which together form a transceiver, may be a radio receiver and a radio transmitter, respectively. Receiver 126 and transmitter 128 are coupled to mobile antenna 130 for receiving and transmitting RF signals from and to base station 104 having base antenna 105.

Processor 122 is coupled to receiver 126 for control and for receiving and processing information from RF signals received through mobile antenna 130. In addition, processor 122 is coupled to transmitter 128 for control and for processing and transmitting information with RF signals. Transmitter 128 includes modulator 142 and power amplifier 144. Modulator 142 has an input coupled to an output of processor 122 and an output coupled to an input of power amplifier 144. In a typical configuration, processor 122 generates control and data information and sends it to modulator 142 for modulation of an RF signal. The modulated RF signal is sent to power amplifier 144 for high power transmission via mobile antenna 130 over a communication channel.

Power amplifier 144 has biasing input 146 that is coupled to energy storage circuit 132. Preferably, energy storage circuit 132 is a capacitor or an electrochemical capacitor having a capacitance greater than 1 mF.

User interface circuitry 136, also coupled to processor 122, includes circuitry to detect user inputs and to provide user output responses. In a typical configuration, user interface circuitry 136 includes key detection circuitry to detect user-actuated keys such as telephone and function keys, display circuitry to display information in a display, and a speaker and a microphone (all not shown).

Preferably, processor 122 includes one or more processors such as a microprocessor or a digital signal processor (DSP), each having a software program and memory for processing, controlling, and operating mobile station 102.

Regulator 120 supplies voltage $V_1$ which powers other parts of mobile station 102 such as processor 122 and receiver 126. Regulators typically require an input voltage greater than the regulated output voltage $V_1$. When the energy source voltage is nearly equal to or less than $V_1$, the output voltage of regulator 120 may be less than the desired voltage $V_1$. In this scenario, $V_1$ is said to be unregulated. When $V_1$ becomes unregulated, the operation of circuits powered by $V_1$, such as the processor and receiver, is unreliable.

In addition, parts of mobile station 102, such as the transmitter, may operate at a second voltage that is greater than, less than, or equal to $V_1$. The voltage requirements of such parts may vary during operation so that these parts operate at a second voltage greater than $V_1$ at one time, less than $V_1$ at another time, or equal to $V_1$ at yet another time.

Turning now to DC-DC converter circuitry 134, oscillator 140 is operatively connected to the base of NPN transistor 148. During operation, oscillator 140 repeatedly outputs a voltage with period $T_{ACTIVE}$ that turns on NPN transistor 148 followed by a second voltage with period $T_{INACTIVE}$ that turns off NPN transistor 148. When NPN transistor 148 turns on, current flows from the energy source 106 through electrical circuitry interface 112, through inductor 150, through NPN transistor 148 to ground. This current flow causes a magnetic field to build up in inductor 150. When NPN transistor 148 turns off, the energy stored in the magnetic field in inductor 150 causes current to flow through diode 152, and into the energy storage circuit 132. Processor 122 controls DC-DC converter circuitry 134 and monitors the voltage on energy storage circuit 132 via connection 162. When the energy storage circuit is charged to the desired voltage $V_{DESIRED}$, processor 122 disables DC-DC converter circuitry 134.

A significant amount of current can be drawn from energy source 106 when NPN transistor 148 is turned on. This peak current can cause the voltage of energy source 106 to sag so low that $V_1$ becomes unregulated. As mentioned, some parts of electrical circuitry 118 may no longer operate reliably. This potential outcome is of increasing concern as energy sources are made smaller and less capable of supply large peak currents.

Comparator 138 has $V_{SOURCE}$ input 166 from energy source interface 108, $V_{THRESH}$ input 168 from processor 122, and output 160 connected to resistor 164. If the voltage of $V_{SOURCE}$ input 166 is greater in magnitude than the voltage of $V_{THRESH}$ input 168, the comparator output is high impedance. If the voltage of input $V_{THRESH}$ 168 is greater in magnitude than the voltage of $V_{SOURCE}$ input 166, the comparator output is low impedance to ground. When the comparator output is low impedance to ground, the base of NPN transistor 148 is held at ground preventing the transistor from turning on.

The operation of comparator 138 will prevent the transistor from turning on whenever the voltage of $V_{SOURCE}$ input 166 is less than $V_{THRESH}$ input 168. Furthermore, the voltage at $V_{THRESH}$ input 168 can be selectively chosen from a multitude of levels by processor 122. Thus, processor 122 can prevent operation of NPN transistor 148 when the energy source voltage $V_{SOURCE}$ falls below a programmed voltage $V_{THRESH}$.

Figure 2:
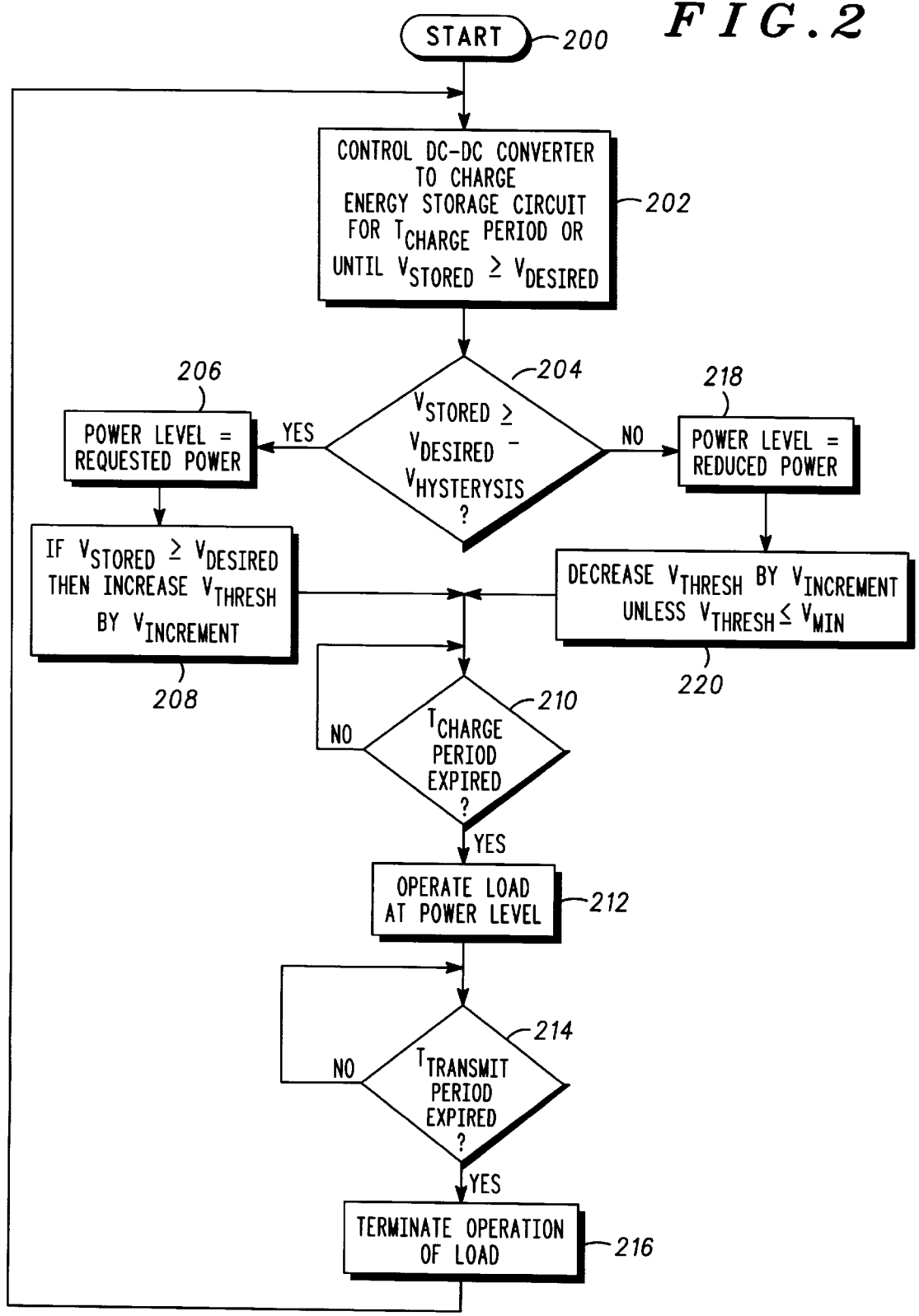
FIG. 2 is a flowchart describing the operation of the electrical circuitry of the mobile station.

FIG. 2 further breaks down the beneficial operation of comparator 138. Prior to start, energy source 106 is coupled to electrical circuitry interface 112. In Step 200, mobile station 102 exits from a standby mode and enters into a talk mode of operation. At the beginning of the talk mode, processor 122 initializes and generates a voltage, $V_{THRESH}$. Processor 122 also initializes $T_{CHARGE}$ and $T_{TRANSMIT}$, which are generally used for timing a charging period and for timing a transmitting period, respectively, of the talk mode. Preferably, processor 122 initializes $T_{CHARGE}$ to 13.33 mS and initializes $T_{TRANSMIT}$ to 6.67 mS. Processor 122 also initializes Requested_Power, which is the desired power level to be transmitted by power amplifier 144 during its next operation. The value of Requested_Power is determined by the operation of communication system 100. For a PDC system the Requested_Power can be one of six steps from 29 dBm to 9 dBm in four dB steps. Processor 122 initializes $V_{THRESH}$ to the minimum value of $V_{SOURCE}$ on which each part of electrical circuitry 118 can operate reliably.

In Step 202, Processor 122 controls DC-DC converter circuitry 136 to charge energy storage circuit 132 fully or partially to a desired voltage, $V_{DESIRED}$. Processor 122 then controls DC-DC converter circuitry 136 to terminate charging of energy storage circuit 132 if $V_{STORED}$ is greater than or equal to $V_{DESIRED}$ or if period $T_{CHARGE}$ expires. More detail regarding Step 202 is described in the discussion regarding FIG. 3.

Figure 3:
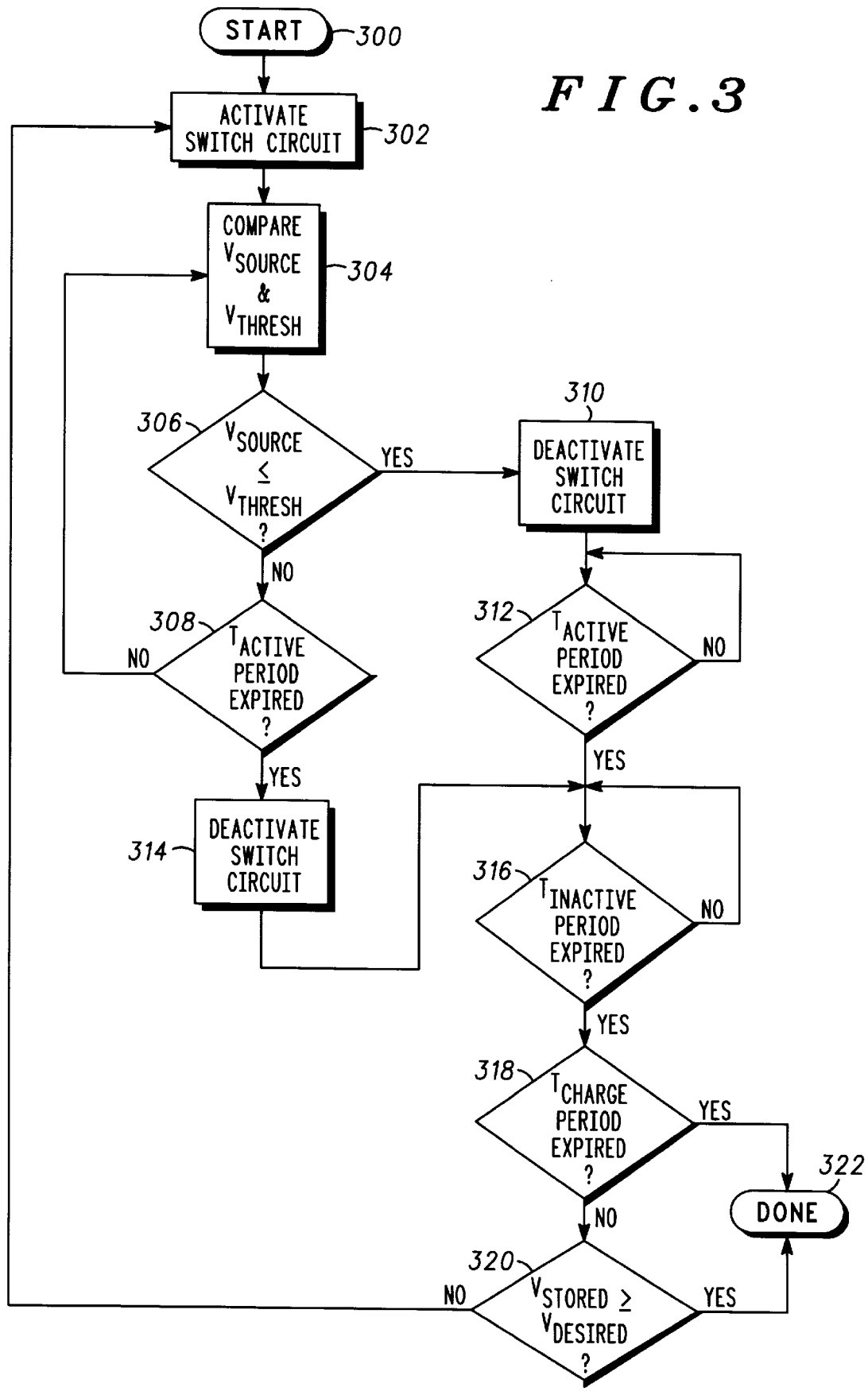
FIG. 3 is a flowchart further describing the operation of the electrical circuitry of the mobile station.

Referring now FIG. 3, Processor 122 initializes a time period $T_{ACTIVE}$ (a period that switch circuit 161 is activated) and a time period $T_{DEACTVE}$ (a period that switch circuit 161 is deactivated). Processor 122 enables oscillator 140 to generate a switch signal at oscillator output 174. The switch signal is a voltage-varying signal, such as a sinusoid, square wave, or other suitable signal, having a first voltage for a $T_{ACTIVE}$ period and a second voltage for a $T_{INACTIVE}$ period. The first voltage is of sufficient level to turn on transistor 148. The second voltage is of sufficient magnitude to turn off transistor 148.

In Step 302, the switch signal from oscillator 140 activates or closes switch circuit 161 so that current flows from energy source 106, through inductor 150, and transistor 148. In response to this switch activation, $V_{SOURCE}$ at electrical circuitry interface 112 begins to drop or sag. During this step, current is forced through inductor 150 causing magnetic energy to by stored in inductor 150.

In Step 304, comparator 138 compares $V_{THRESH}$ and $V_{SOURCE}$. In Step 306, if $V_{SOURCE}$ is less than or equal to $V_{THRESH}$ at Step 304, the method continues at Step 310. In Step 310, oscillator 140 deactivates or opens switch circuit 161 so that current ceases to flow from the energy source. In response to this switch deactivation, $V_{SOURCE}$ at electrical circuitry interface 112 begins to recover to its nominal voltage. From Step 310 the method moves to Step 312 until $T_{ACTIVE}$ period expires, when the method moves to Step 316.

Further in Step 306, if $V_{SOURCE}$ is not less than or equal to $V_{THRESH}$ at Step 304, the method continues at Step 308. If $T_{ACTIVE}$ period has not expired at step 308, the method returns to Step 304 where comparator 138 continues to compare $V_{THRESH}$ and $V_{SOURCE}$. Thus, switch circuit 161 remains activated and current flows until $V_{SOURCE}$ is less than or equal to $V_{THRESH}$ or until $T_{ACTIVE}$ expires.

In Step 314, if the $T_{ACTIVE}$ period has expired at step 308, oscillator 140 deactivates or opens switch circuit 161 so that current ceases to flow from the energy source. In response to this switch deactivation, $V_{SOURCE}$ at electrical circuitry interface 112 begins to recover to its nominal voltage.

In Step 316, during the time period of $T_{DEACTIVE}$ the magnetic energy stored in inductor 150 forces current through diode 152 and into energy storage circuit 132.

In Step 318, if the charge period $T_{CHARGE}$ has not expired the method moves to Step 320. In Step 320, if energy storage circuit 132 has not been charged to the desired voltage level, then DC-DC converter circuitry 134 returns to Step 302 and thus continues with another charging cycle.

Referring back to Step 204 in FIG. 2, if DC-DC converter circuitry 134 is capable of charging energy storage circuit 132 to $V_{DESIRED}$ minus $V_{HYSTERYSIS}$, then Power_Level is set equal to Requested_Power in Step 206. Power_Level is the RF power that will actually be transmitted during the next burst.

In Step 208, if $V_{STORED}$ is greater than $V_{DESIRED}$, then $V_{THRESH}$ is increased by $V_{INCREMENT}$. By increasing the threshold voltage switch circuit 161 will be deactivated at a higher voltage of energy source 106, causing DC-DC converter circuit 134 to require more time to charge energy storage circuit 132 to the desired voltage. $V_{HYSTERYSIS}$ is used to prevent the system from oscillating between Step 206 and Step 218 on consecutive trips through the flow chart described in FIG. 2.

In step 204, if DC-DC converter circuitry 134 is unable to fully charge energy storage circuit 132 to $V_{DESIRED}$ minus $V_{HYSTERYSIS}$ then the energy available to the transmitter will be insufficient to support transmitting full power out. If Requested_Power is equal to the highest power step (29 dBm for PDC), then the Power_Level is set to a reduced level of 25 dBm in Step 218. By reducing the RF power to be transmitted, the energy needs of the transmitter are reduced to the energy available in the energy storage circuit 132.

In Step 220, if $V_{THRESH} > V_{MIN}$ then $V_{THRESH}$ is reduced by $V_{INCREMENT}$. By decreasing the threshold voltage, DC-DC converter circuitry 134 is permitted to pull the energy source lower in voltage to facilitate charging energy storage circuit 132 to the desired voltage.

In Step 210, after waiting for any remaining time of $T_{CHARGE}$ to expire, transmitter 128 is enabled and transmits RF power at Power_Level in Step 212. After transmitter 128 has been active for the prescribed amount of time in Step 214, transmitter 128 is disabled in Step 216.

Figure 4:
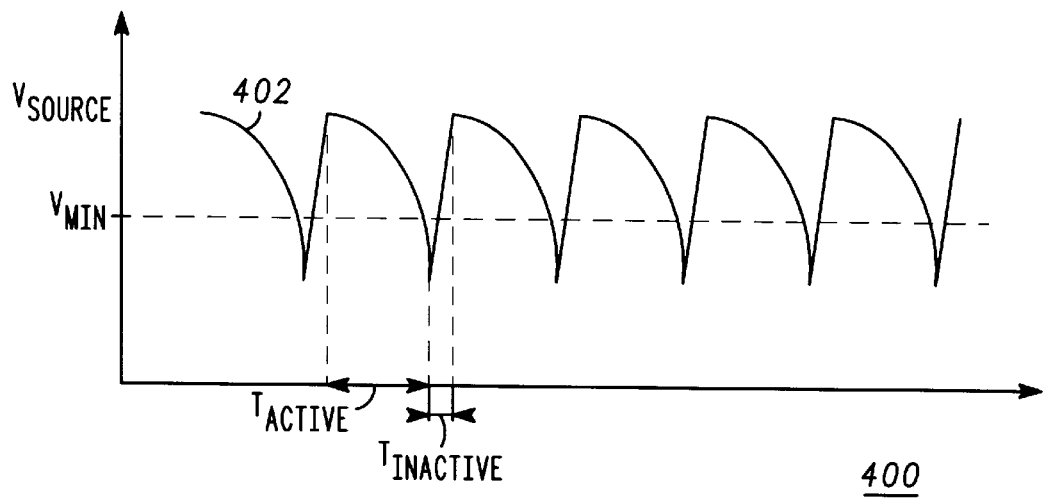
FIG. 4 is a graph showing a source voltage ($V_{SOURCE}$) versus time during a charging mode of the mobile station, where a comparator circuit of the electrical circuitry is not utilized.

FIG. 4 illustrates the voltage sag of energy source 106 that can occur during a cycle of DC-DC converter circuit 134. During time $T_{ACTIVE}$ the voltage of energy source 106 drops below $V_{MIN}$, which is the minimum operating voltage for reliable operation of electrical circuitry 118. During time $T_{DEACTIVE}$ the voltage of energy source 106 recovers.

Figure 5:
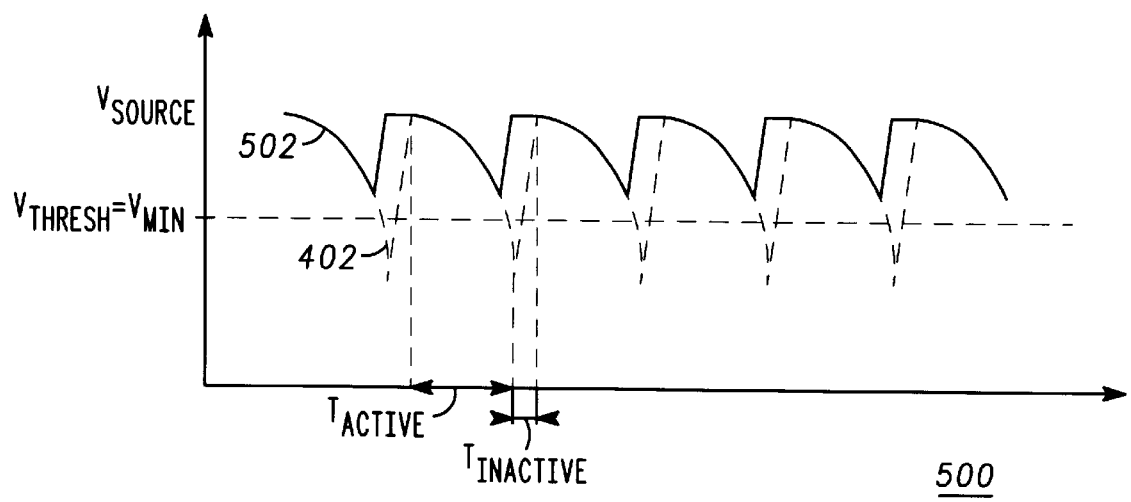
FIG. 5 is a graph showing the source voltage ($V_{SOURCE}$) versus time during the charging mode, where the comparator circuit of the electrical circuitry is utilized.

FIG. 5 illustrates the beneficial improvements of the invention. During time $T_{ACTIVE}$, the voltage of energy source 106 drops. However, comparator 138 prematurely turns off switch circuit 161 when the voltage of energy source 106 reaches $V_{THRESH}$ which is above $V_{MIN}$. This prevents DC-DC converter circuit 134 from pulling the voltage of energy source 106 below $V_{MIN}$, and allows electrical circuitry 118 to continue reliable operation. Thus, the invention can modify the operation of a DC-DC converter to prevent it from pulling the energy source voltage below a minimum desired voltage.

Figure 6A:
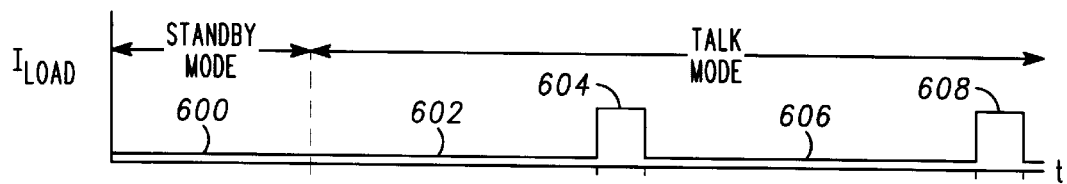
FIG. 6A is a graph showing a load current ($I_{LOAD}$) of the mobile station versus time.
Figure 6B:
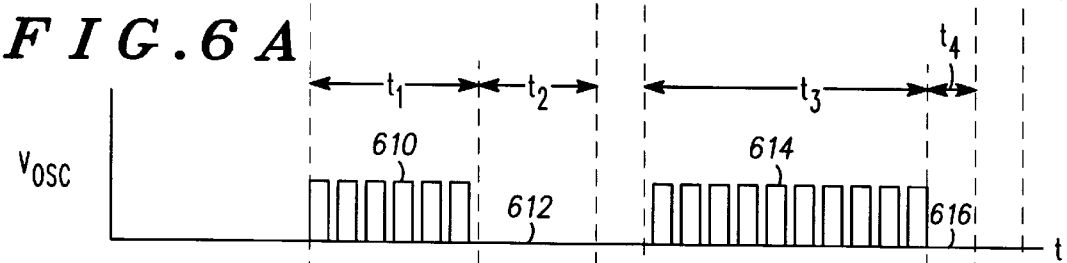
FIG. 6B is a graph showing an oscillator output voltage ($V_{OSC}$) of an oscillator circuit versus time.

FIGS. 6A through 6D depict another beneficial operation of the comparator circuit. FIG. 6A shows the current drain required by power amplifier 144, $I_{LOAD}$. Current pulses 604 and 608 are drawn while transmitting. During time $t_1$, DC-DC converter circuitry 134 operates to charge energy storage circuit 132 to a desired voltage $V_{DESIRED}$. Oscillator 140, comparator 138, and switch circuit 161 all operate as depicted by pulses 610 in FIG. 6B.

Figure 6C:
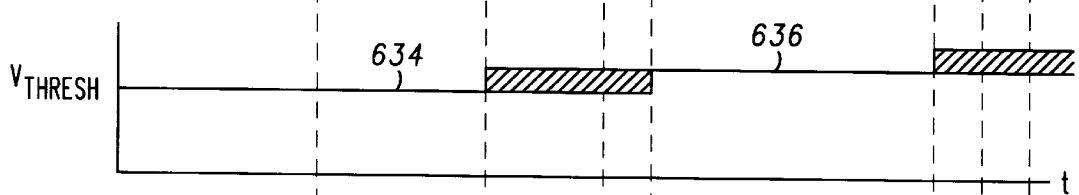
FIG. 6C is a graph showing a threshold voltage ($V_{THRESH}$) versus time.
Figure 6D:
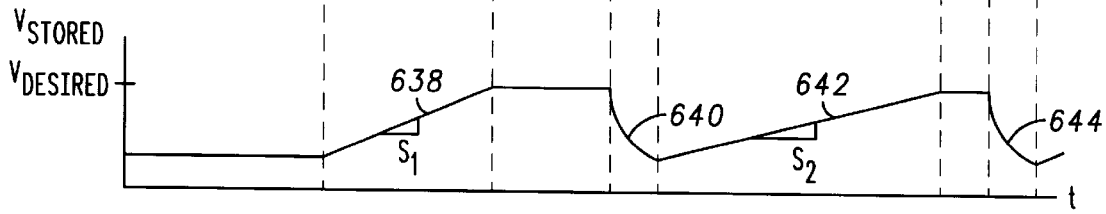
FIG. 6D is a graph showing a stored voltage ($V_{STORED}$) of an energy storage circuit versus time.

During time $t_2$, energy storage circuit 132 is charged to $V_{DESIRED}$. Oscillator 140, comparator 138, and switch circuit 161 cease functioning as depicted by the lack of pulses 612 in FIG. 6B. Since DC-DC converter circuitry 134 was able to charge energy storage circuit 132 prior to the transmitted burst 604, processor 122 increases the threshold voltage from 634 to 636 as shown in FIG. 6C. When power amplifier 144 transmits burst as depicted by 604, it cause energy storage circuit 132 to discharge as depicted by 640 as shown in FIG. 6D.

During time $t_3$, DC-DC converter circuit 134 again operates to charge energy storage circuit 132 as depicted by 642. Again, oscillator 140, comparator 138, and switch circuit 161 operate as depicted by pulses 614. During $t_4$, energy storage circuit 132 is charged to $V_{DESIRED}$ and oscillator 140, comparator 138, and switch circuit 161 cease operation as depicted by 616.

Note that the time period of $t_3$ is greater than $t_1$. The time period $t_4$ is less than $t_2$. The operation of the comparator 138 will cause DC-DC converter circuit 134 to take the maximum possible time available to charge energy storage circuit 132, by minimizing the maximum current drain required from energy source 106.

FIGS. 7A and 7B are a simulation of a DC-DC converter without the beneficial use of a comparator circuit. The energy source for the simulation is a 1.5V AA primary cell. FIG. 7A is the voltage stored on the energy storage circuit $V_{STORED}$. FIG. 7A shows that the DC-DC converter requires 10.96 mS to charge an energy storage circuit to 3.8V. FIG. 7B shows the voltage of the energy source $V_{SOURCE}$ drops as low as 1.09V during the operation of the DC-DC converter.

Figure 8A:
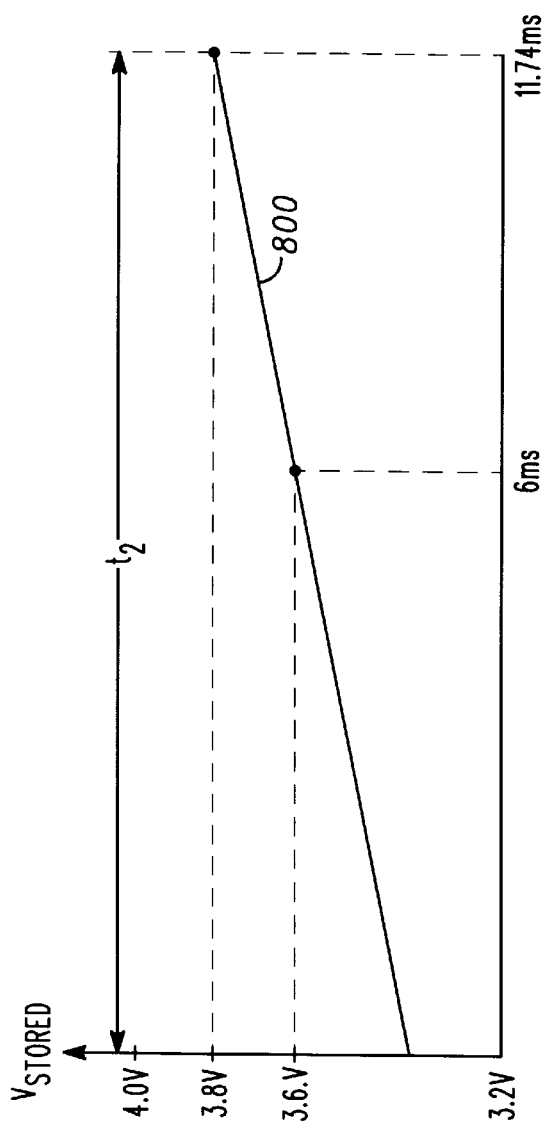
FIG. 8A is a graph showing a stored voltage ($V_{STORED}$) of an energy storage circuit versus time, using a second test circuit having a comparator circuit.
Figure 8B:
FIG. 8B is a graph showing a source voltage ($V_{SOURCE}$) of the second test circuit versus time.

FIGS. 8A and 8B are a simulation of the same DC-DC converter used in FIGS, 7A and 7B with the beneficial use of a comparator circuit. FIG. 8A shows that the DC-DC converter charges an energy storage circuit to a voltage ($V_{STORED}$) of 3.8V in 11.74 mS. This time period is longer than the 10.96 mS required in FIG. 7A. FIG. 7B shows that the voltage of the energy source $V_{SOURCE}$ drops as low as 1.27V during the operation of the DC-DC converter. This is substantially higher than 1.09V from FIG. 7B.

From these examples, the threshold voltage can be set slightly above the minimum voltage on which the parts of electrical circuitry 118 can operate reliably. The comparator circuit prevents the energy source voltage from falling below the threshold voltage ($V_{THRESH}$). Thus, beneficial use of the comparator circuit will enable the DC-DC converter operate without causing unreliable operation of the electrical circuits.

Consequently, an electronic circuit in accordance with the present invention reduces the requirements of the energy source, thus reducing the size of an electronic device.

Energy sources for portable electronic devices are typically Nickel-Metal-Hydride (NiMH), Nickel-Cadmium (NiCAD), or Lithium Ion batteries. These devices are specified to have a capacity at a given current drain. The higher the current required, the lower the capacity. The lower the current required, the higher the capacity. By minimizing the maximum current required from the energy source to power the DC-DC converter, the present invention has the added benefit of maximizing capacity of the energy source.

Several system configurations are possible. In one configuration, energy source 106 is a lithium ion battery providing a nominal operating voltage of about 3.6 volts. Energy storage circuit 132 is an electrochemical capacitor having a capacitance of about 0.07 farads and a maximum operating voltage of about 4.8 volts. Regulator 120 generates a main supply voltage of about 2.7 volts.

In another configuration, energy source 106 is a single cell battery providing a nominal operating voltage of about 1.5 volts. Energy storage circuit 132 is an electrochemical capacitor having a capacitance of about 0.07 farads and a maximum operating voltage of about 2.4 volts. Regulator 120 generates a main supply voltage of about 0.9 volts.

It is understood that energy source interface 108 may be switchably coupled to different energy storage circuits including an electrochemical capacitor, a capacitor, a supercapacitor, an ultracapacitor, or another suitable circuit. An electrochemical capacitor is preferred since it is much smaller in size than traditional dielectric or electrolytic capacitors having the same capacitance. It is also understood that energy storage circuit 132 may be switchably coupled to a load other than power amplifier 144.

The description of the present invention describes operation of a boost mode DC-DC converter. However, it is understood that the circuits and techniques described can easily be utilized by other modes of DC-DC converters, such as a buck mode converter or a buck-boost mode converter.

The present invention has been described in connection with the embodiments shown in the figures. However, other embodiments may be used and changes may be made for performing the same function of the invention without deviating from it. For example, the electronic device and method of the present invention may be useful in a portable radio communication device that operates in a system other than a PDC system, such as a Group Special Mobile (GSM) system. It is therefore intended in the appended claims to cover all such changes and modifications which fall within the true spirit and scope of the invention. Therefore, the present invention is not limited to any single embodiment and should be construed to the extent and scope of the appended claims.

What is claimed is:

1. An electronic device, comprising:
    an electrical circuitry interface adapted for coupling with an energy source;
    a comparator operatively connected to the electrical circuitry interface to receive a source voltage from the energy source at a first input and operatively connected to receive a threshold voltage at a second input, the comparator providing a comparison output;
    a DC-DC converter circuitry operatively connected to the electrical circuitry interface to receive power from the energy source, the DC-DC converter circuitry comprising,
    a switch circuit operatively connected to the electrical circuitry interface and operatively connected to receive the comparison output from the comparator, and
    an energy storage circuit operatively connected to the switch circuit; and
    an amplifier having a biasing input coupled to said energy storage circuit.

2. An electronic device according to claim 1, wherein the energy source is at least one battery.

3. An electronic device according to claim 1, further comprising a first electronic circuit operatively connected to the electrical circuitry interface to receive power from the energy source.

4. An electronic device according to claim 3, wherein the first electronic circuit is at least one processor.

5. An electronic device according to claim 4, wherein the at least one processor is operatively connected to provide the threshold voltage to the comparator.

6. An electronic device according to claim 4, wherein the at least one processor is operatively connected to provide a control signal to the DC-DC converter circuitry and to monitor the energy storage circuit.

7. An electronic device according to claim 4, wherein the at least one processor comprises a microprocessor.

8. An electronic device according to claim 7, wherein the at least one processor further comprises a digital signal processor.

9. An electronic device according to claim 1, wherein said energy storage circuit comprises a capacitor.

10. An electronic device according to claim 1, wherein said energy storage circuit comprises an electrochemical capacitor.

11. An electronic device according to claim 1, further comprising
a first electronic circuit operatively connected to the electrical circuitry interface and operable at a first voltage; and
a second electronic circuit operatively connected to the energy storage circuit and including the amplifier, the second electronic circuit operable at a second voltage.

12. An electronic device according to claim 11, wherein the second voltage is equal to the first voltage.

13. An electronic device according to claim 11, wherein the second voltage is a variable voltage.

14. An electronic device according to claim 11, wherein the switch circuit is variably operative to charge the energy storage circuit to the second voltage.

15. An electronic device according to claim 11, wherein the second electronic circuitry comprises a transmitter.

16. An electronic device, comprising,
an electrical circuitry interface adapted for coupling with an energy source;
a comparator operatively connected to the electrical circuitry interface to receive a source voltage from the energy source at a first input and operatively connected to receive a threshold voltage at a second input, the comparator providing a comparison output;
a DC-DC converter circuitry operatively connected to the electrical circuitry interface to receive power from the energy source, the DC-DC converter circuitry comprising,
a switch circuit operatively connected to the electrical circuitry interface and operatively connected to receive the comparison output from the comparator, and
an energy storage circuit operatively connected to the switch circuit;
a first electronic circuit operatively connected to the electrical circuitry interface and operable at a first voltage; and
a second electronic circuit operatively connected to the energy storage circuit and operable at a second voltage,
wherein the energy storage circuit comprises a capacitor;
wherein the first electronic circuit comprises at least one processor;
wherein the second electronic circuit comprises a transmitter having a power amplifier with a biasing input coupled to the energy storage circuit;
wherein the power amplifier operates up to a first power level when the capacitor is charged to a first voltage;
wherein the power amplifier operates up to a second power level when the capacitor is charged to a second voltage; and
wherein the first voltage is greater than the second voltage and the first power level is greater than the second power level.

17. An electronic device according to claim 16, wherein the DC-DC converter circuitry further comprises an oscillator operatively connected to receive a control signal from the at least one processor and operatively connected to provide a control voltage to the switch circuit in time intervals.

18. A method of charging an energy storage circuit, comprising the steps of:
(a) providing an electronic device, comprising:
an electrical circuitry interface adapted for coupling with an energy source;
a comparator operatively connected to the electrical circuitry interface to receive a source voltage from the energy source at a first input and operatively connected to receive a threshold voltage at a second input, the comparator providing a comparison output;
a DC-DC converter circuitry operatively connected to the electrical circuitry interface to receive power from the energy source, the DC-DC converter circuitry comprising,
a switch circuit operatively connected to the electrical circuitry interface and operatively connected to receive the comparison output from the comparator, and
an energy storage circuit operatively connected to the switch circuit; and
an amplifier having a biasing input coupled to said energy storage circuit;
(b) comparing a source voltage from the energy source and a threshold voltage;
(c) activating the DC-DC converter circuitry after a first predetermined time interval has expired and when the source voltage is greater than the threshold voltage so that electrical energy flows from an energy source to charge the energy storage circuit;
(d) first deactivating the DC-DC converter circuitry in response to the source voltage being not greater than the threshold voltage to stop the flow of electrical energy from the energy source to the energy storage circuit; and
(e) second deactivating the DC-DC converter circuitry when a second predetermined time interval has expired to stop the flow of electrical energy from the energy source to the energy storage circuit.

19. A method according to claim 18, wherein step (b) of comparing is continuous through subsequent steps of the method.

20. A method according to claim 18, wherein step (b) of comparing is intermittent during subsequent steps of the method.

21. A method according to claim 18,
wherein the step (c) of activating comprises activating a switch circuit in the DC-DC converter circuitry,
wherein the step (d) of first deactivating comprises deactivating the switch circuit in the DC-DC converter circuitry, and
wherein the step (e) of second deactivating comprises deactivating the switch circuit in the DC-DC converter circuitry.

22. A method according to claim 18, further comprising the step of:
(f) third deactivating the DC-DC converter circuitry when the energy storage circuit is charged to a predetermined voltage to stop the flow of electrical energy from the energy source to the energy storage circuit.

23. A method according to claim 18, further comprising the step of:
(F) maintaining operation of an electronic circuit during each step of the method.

24. A method according to claim 18, further comprising the steps of:
(f) maintaining operation of a first electronic circuit at a first voltage during each step of the method; and
(g) operating a second electronic circuit at a second voltage.

25. A method according to claim 24, wherein step (b) comprises the substep (b1) of charging the energy storage circuit to the second voltage.

26. A method according to claim 24, wherein the second voltage is equal to the first voltage.

27. A method according to claim 24, wherein the second voltage is a variable voltage.

28. A method of charging an energy storage circuit, the method comprising the steps of:
(a) providing an electronic device, comprising:
an electrical circuitry interface adapted for coupling with an energy source;
a comparator operatively connected to the electrical circuitry interface to receive a source voltage from the energy source at a first input and operatively connected to receive a threshold voltage at a second input, the comparator providing a comparison output;
a DC-DC converter circuitry operatively connected to the electrical circuitry interface to receive power from the energy source, the DC-DC converter circuitry comprising,
a switch circuit operatively connected to the electrical circuitry interface and operatively connected to receive the comparison output from the comparator, and
the energy storage circuit operatively connected to the switch circuit;
an amplifier having a biasing input coupled to said energy storage circuit;
a first electronic circuit operable at a first voltage; and
a second electronic circuit operable at a second voltage, the second electronic circuit coupled to the energy storage circuit;
(b) activating the DC-DC converter circuitry so that electrical energy flows from the energy source to charge the energy storage circuit;
(c) first deactivating the DC-DC converter circuitry when the source voltage is not greater than the first voltage to stop the flow of electrical energy to the energy storage circuit;
(d) second deactivating the DC-DC converter circuitry when a predetermined time interval has expired to stop the flow of electrical energy to the energy storage circuit;
(e) repeating step (b), step (c), and step (d) until the energy storage circuit is charged to the second voltage;
(f) operating the first electronic circuit at the first voltage during step (b), step (c), and step (d); and
(g) operating the second electronic circuit after the energy storage circuit is charged to the second voltage.

29. A method according to claim 28, wherein the second voltage is equal to the first voltage.

30. A method according to claim 28, wherein the second voltage is a variable voltage.

31. A method according to claim 28,
wherein the step (b) of activating comprises activating the switch circuit in the DC-DC converter circuitry,
wherein the step (c) of first deactivating comprises deactivating the switch circuit in the DC-DC converter circuitry, and
wherein the step (d) of second deactivating comprises deactivating the switch circuit in the DC-DC converter circuitry.

* * * * *